United States Patent
Manabe et al.

(10) Patent No.: US 10,240,661 B2
(45) Date of Patent: Mar. 26, 2019

(54) END FIXING STRUCTURE OF COMPOSITE WIRE ROD

(71) Applicant: TOKYO ROPE MFG. CO., LTD., Chuo-ku, Tokyo (JP)

(72) Inventors: Daisuke Manabe, Tokyo (JP); Shunji Hachisuka, Tokyo (JP); Hiroshi Kimura, Tokyo (JP); Fumihiro Matsuda, Tokyo (JP); Nobuhiro Kai, Fukuoka (JP); Hiroyuki Shimmura, Fukuoka (JP); Kohsuke Ashizuka, Fukuoka (JP)

(73) Assignee: TOKYO ROPE MFG. CO., LTD., Tokyo (JP)

( * ) Notice: Subject to any disclaimer, the term of this patent is extended or adjusted under 35 U.S.C. 154(b) by 0 days.

(21) Appl. No.: 15/676,827

(22) Filed: Aug. 14, 2017

(65) Prior Publication Data

US 2017/0343078 A1    Nov. 30, 2017

Related U.S. Application Data

(63) Continuation of application No. PCT/JP2015/086517, filed on Dec. 28, 2015.

(30) Foreign Application Priority Data

Feb. 16, 2015  (WO) .................. PCT/JP2015/054143

(51) Int. Cl.
*F16G 11/04* (2006.01)
*D07B 1/00* (2006.01)
*D07B 1/18* (2006.01)

(52) U.S. Cl.
CPC ............ *F16G 11/048* (2013.01); *D07B 1/005* (2013.01); *D07B 1/18* (2013.01)

(58) Field of Classification Search
CPC .......... D07B 1/005; D07B 1/18; F16G 11/048
See application file for complete search history.

(56) References Cited

U.S. PATENT DOCUMENTS 3,163,902 A  *  1/1965  Bernburg .............. F16G 11/048
                                                        403/369
3,220,074 A  *  11/1965  Ehmann ................. D07B 1/167
                                                        24/115 M (Continued)

FOREIGN PATENT DOCUMENTS

JP         45012981 Y1       6/1970
JP         48018649 A        3/1973

(Continued)

OTHER PUBLICATIONS

International Search Report (ISR) and Written Opinion dated Mar. 15, 2016 issued in International Application No. PCT/JP2015/086517.

(Continued)

*Primary Examiner* — Robert Sandy
*Assistant Examiner* — David M Upchurch
(74) *Attorney, Agent, or Firm* — Holtz, Holtz & Volek PC

(57) ABSTRACT

An end fixing structure of a composite wire rod includes a composite wire rod, a wedge body that is formed into a cylindrical shape with an enlarging diameter from a front end portion, wherein an inner wall surface is formed for engaging with the outer surface of the composite wire rod which is copied onto the inner wall surface, and a sleeve provided on an outer peripheral side of the wedge body and having a conical and hollow inner structure, and the wedge body consists of a plurality of divided wedge bodies, facing each other on their divided surfaces with a space therebetween, and the inner wall surface in the divided wedge body is made of microscopic irregularities, thereby shortening a (Continued)

processing time and maintaining a sufficient gripping power over long term.

7 Claims, 12 Drawing Sheets

(56) References Cited

U.S. PATENT DOCUMENTS

| | | | | |
|---|---|---|---|---|
| 3,254,383 | A * | 6/1966 | Ehmann | F16G 11/048 403/275 |
| 3,676,899 | A * | 7/1972 | Ehlert | F16G 11/048 403/247 |
| 3,676,900 | A * | 7/1972 | De Valenzuela | E04C 5/122 403/374.2 |
| 3,879,147 | A * | 4/1975 | Morell | E04C 5/122 24/115 M |
| 3,952,377 | A * | 4/1976 | Morell | E04C 5/122 24/136 R |
| 4,615,532 | A * | 10/1986 | Biller | F16G 11/048 24/115 M |
| 4,835,822 | A * | 6/1989 | Savall | E04C 5/122 24/115 R |
| 5,308,026 | A * | 5/1994 | Shaw | G02B 6/4422 24/115 M |
| 5,455,078 | A | 10/1995 | Kanzaki | |
| 8,425,143 | B2 | 4/2013 | Kondo et al. | |
| 9,086,117 | B2 | 7/2015 | Van Der Ende | |
| 9,562,321 | B2 | 2/2017 | Manabe et al. | |
| 9,828,724 | B2 * | 11/2017 | Kindstrand | D07B 1/18 |
| 2004/0197478 | A1 * | 10/2004 | Takagi | C23C 18/22 427/306 |
| 2012/0141198 | A1 | 6/2012 | Kondo et al. | |
| 2012/0240365 | A1 * | 9/2012 | Van der Ende | E21B 19/12 24/457 |
| 2012/0297703 | A1 | 11/2012 | Sentry et al. | |
| 2014/0341646 | A1 * | 11/2014 | Watanabe | F16G 11/04 403/361 |
| 2016/0237615 | A1 | 8/2016 | Manabe et al. | |

FOREIGN PATENT DOCUMENTS

| | | |
|---|---|---|
| JP | 01272889 A | 10/1989 |
| JP | 03229042 A | 10/1991 |
| JP | 08237840 A | 9/1996 |
| JP | 2001165245 A | 6/2001 |
| JP | 5426678 B2 | 2/2014 |
| WO | 03029519 A1 | 4/2003 |
| WO | 2011019075 A1 | 2/2011 |
| WO | 2011051678 A1 | 5/2011 |
| WO | 2015125220 A1 | 8/2015 |
| WO | 2016132437 A1 | 8/2016 |

OTHER PUBLICATIONS

International Preliminary Report on Patentability (IPRP) dated Aug. 31, 2017 issued in International Application No. PCT/JP2015/054143.

International Preliminary Report on Patentability (IPRP) dated Aug. 31, 2017 issued in International Application No. PCT/JP2015/086517.

Japanese Office Action (and English language translation thereof) dated Jun. 5, 2018 issued in counterpart Japanese Application No. 2017-500307.

Japanese Office Action (and English language translation thereof) dated Jun. 5, 2018 issued in counterpart Japanese Application No. 2017-500156.

Canadian Office Action dated May 25, 2018 issued in Canadian Application No. 2,976,625.

Canadian Office Action dated May 28, 2018 issued in counterpart Canadian Application No. 2,976,622.

Japanese Office Action dated Oct. 30, 2018 (and English translation thereof) issued in Japanese Application No. 2017-500307.

* cited by examiner

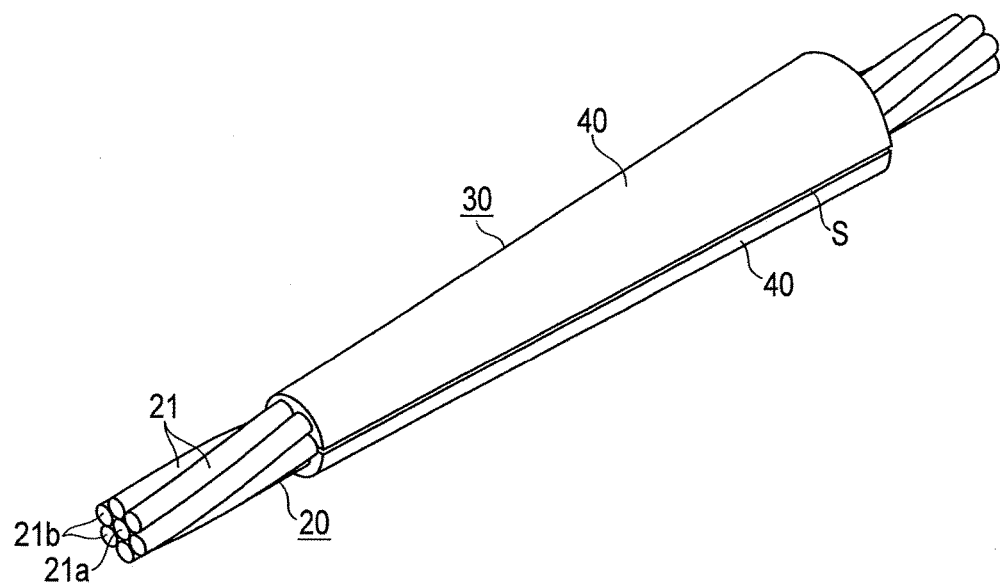
F I G. 3
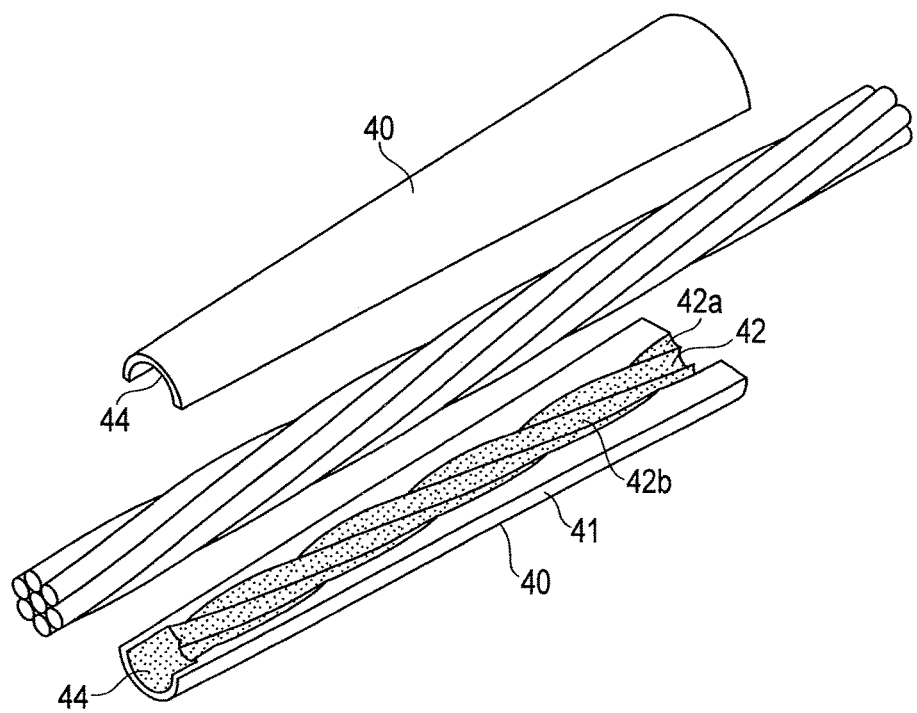
F I G. 4

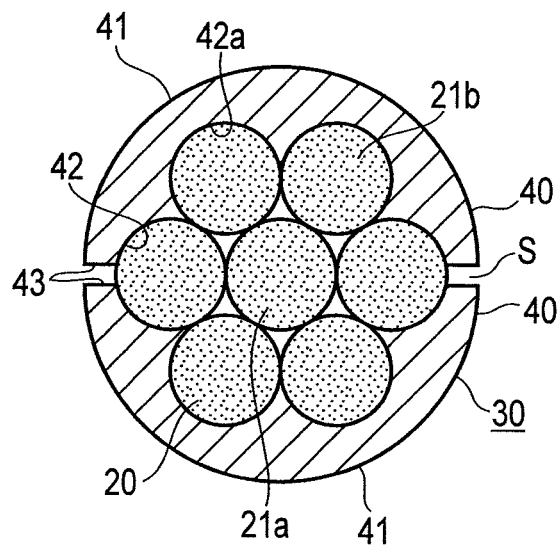
F I G. 5
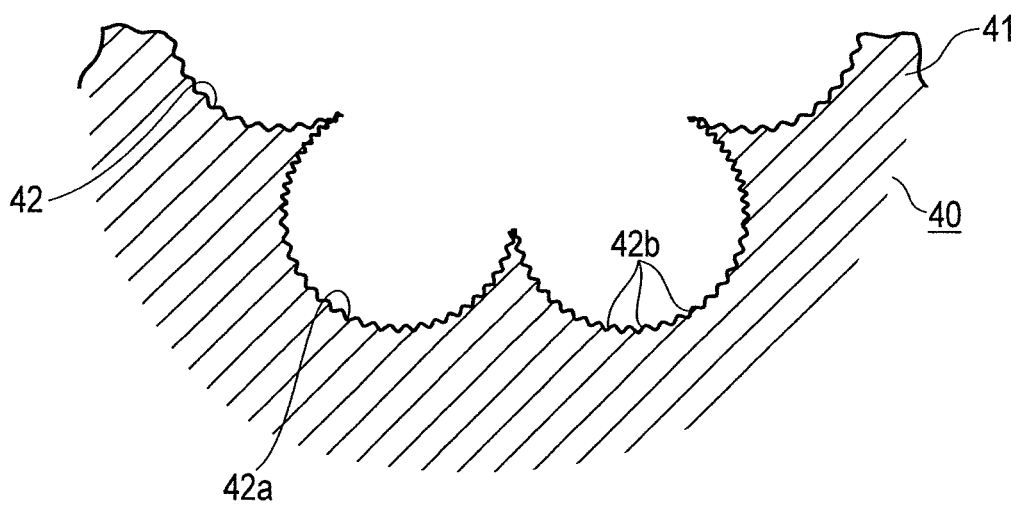
F I G. 6

| No. | 1 | 2 | 3 | 4 | 5 | 6 | 7 | 8 | 9 |
|---|---|---|---|---|---|---|---|---|---|
| Surface roughness Rz($\mu$m) | 200 | 200 | 200 | 30 | 60 | 300 | 500 | 800 | 200 |
| Wedge length(mm) | 130 | 150 | 210 | 150 | 150 | 150 | 150 | 150 | 280 |
| Fixing load(kN) | 196 | 234 | 278 | 170 | 225 | 230 | 210 | 185 | 280 |
| Fixing efficiency(%) | 73 | 87 | 103 | 63 | 83 | 85 | 78 | 69 | 104 |
| Breakage state | Broken | Broken | Broken | Fell out | Broken | Broken | Broken | Fell out | Broken |
| Evaluation | × | ○ | ○ | × | ○ | ○ | ○ | × | ○ |

F I G. 7

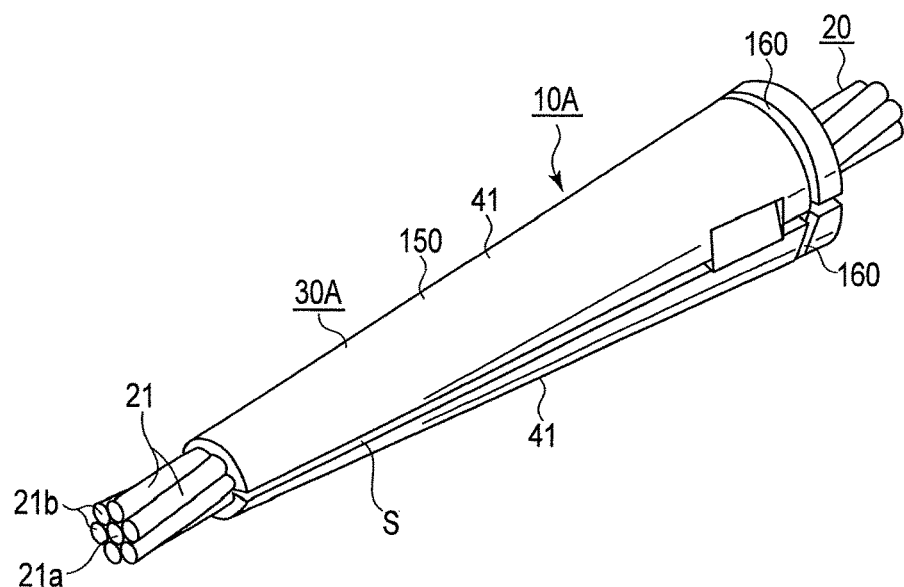
F I G. 8
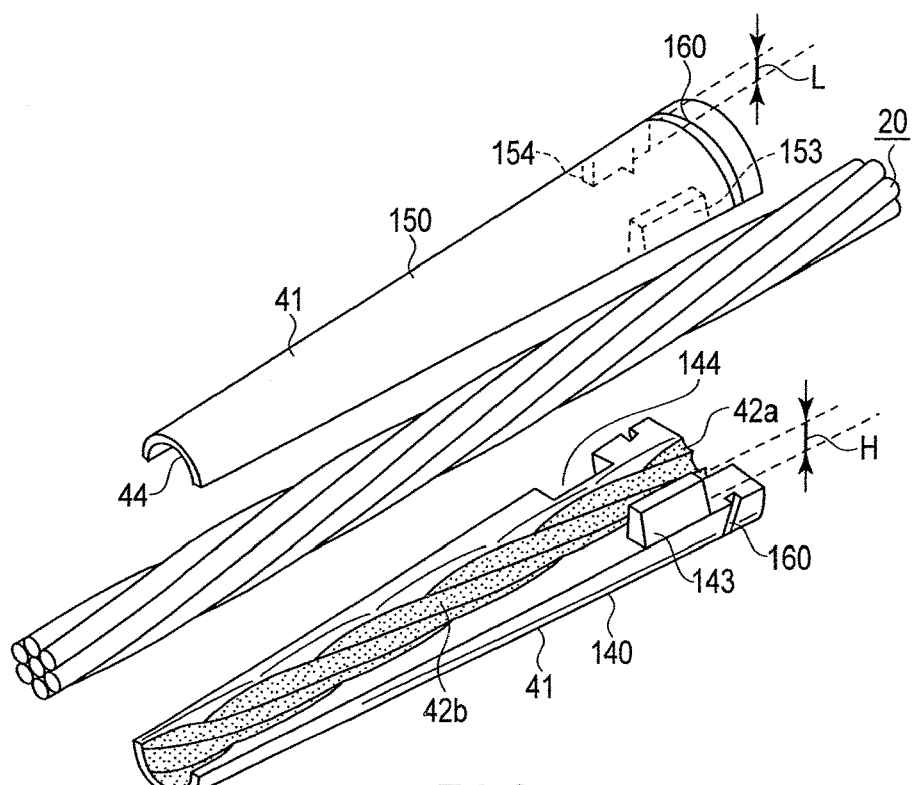
F I G. 9

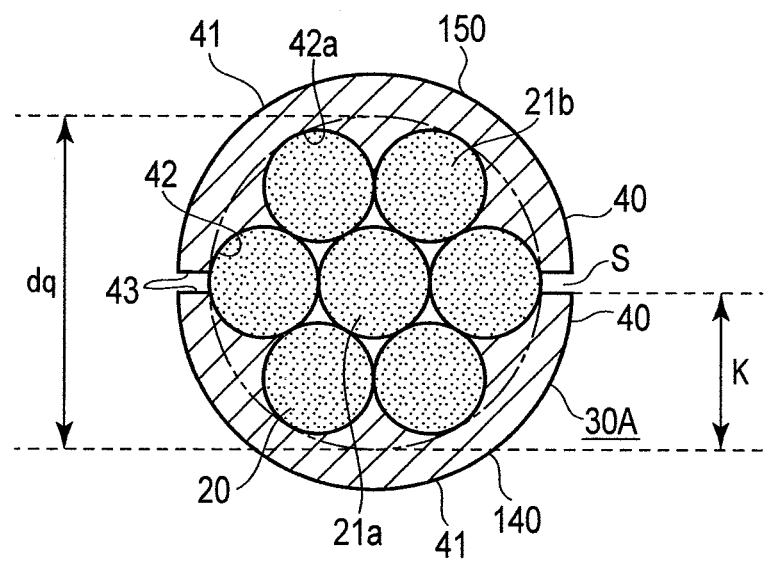
F I G. 10
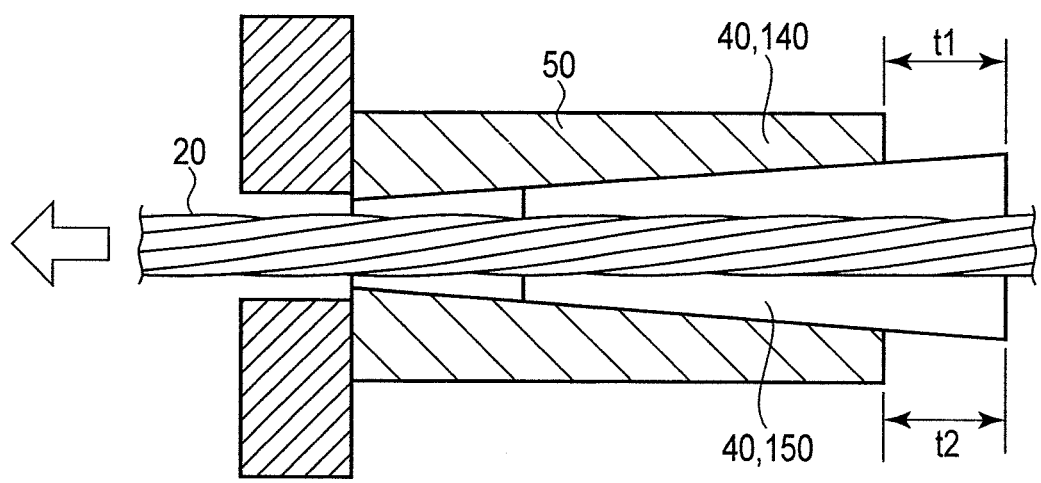
F I G. 11A

| Load(kN) | Wedge position | | |
|---|---|---|---|
| | t1(mm) | t2(mmm) | Difference(mm) |
| 0 | 22.64 | 22.62 | 0.02 |
| 20 | 21.05 | 20.99 | 0.06 |
| 40 | 17.35 | 17.21 | 0.14 |
| 60 | 14.33 | 14.55 | −0.22 |
| 80 | 12.46 | 12.42 | 0.04 |
| 100 | 10.81 | 10.72 | 0.09 |
| 120 | 9.44 | 9.38 | 0.06 |
| 140 | 7.90 | 8.13 | −0.23 |
| 160 | 7.21 | 7.09 | 0.12 |
| 180 | 6.21 | 6.26 | −0.05 |
| 200 | 4.95 | 4.92 | 0.03 |
| 220 | 3.92 | 3.97 | −0.05 |
| 240 | 3.04 | 3.00 | 0.04 |
| 260 | 2.10 | 2.06 | 0.04 |
| 280 | 0.85 | 0.90 | −0.05 |
| 300 | − | − | − |

F I G. 12

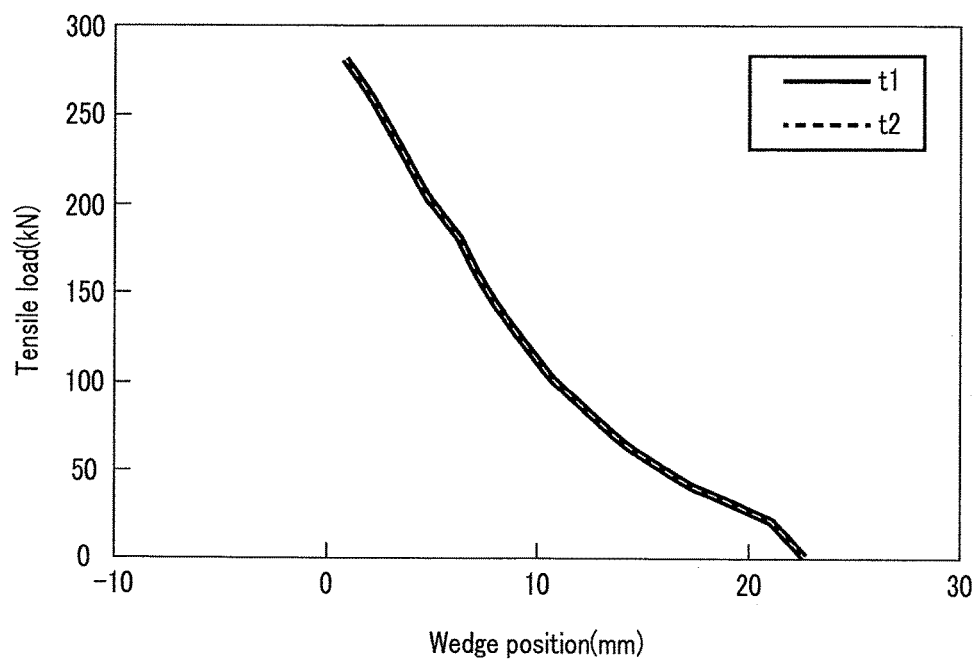
F I G. 13

| Load(kN) | Wedge position | | |
|---|---|---|---|
| | t1(mm) | t2(mmm) | Difference(mm) |
| 0 | 22.55 | 22.53 | 0.02 |
| 20 | 21.15 | 20.95 | 0.20 |
| 40 | 16.31 | 16.44 | −0.13 |
| 60 | 13.29 | 13.05 | 0.24 |
| 80 | 11.00 | 10.92 | 0.08 |
| 100 | 9.05 | 9.26 | −0.21 |
| 120 | 8.04 | 8.17 | −0.13 |
| 140 | 6.97 | 6.91 | 0.06 |
| 160 | 6.04 | 5.93 | 0.11 |
| 180 | 4.72 | 5.04 | −0.32 |
| 200 | 2.93 | 4.44 | −1.51 |
| 220 | −0.42 | 3.87 | −4.29 |
| 240 | − | − | − |
| 260 | − | − | − |
| 280 | − | − | − |
| 300 | − | − | − |

FIG. 14

END FIXING STRUCTURE OF COMPOSITE WIRE ROD

CROSS-REFERENCE TO RELATED APPLICATIONS

This application is a Continuation application of PCT Application No. PCT/JP2015/086517, filed Dec. 28, 2015 and based upon and claiming the benefit of priority from PCT Application No. PCT/JP2015/054143, filed Feb. 16, 2015, the entire contents all of which are incorporated herein by reference.

FIELD

The present invention relates to an end fixing structure of a composite wire rod used for fixing ends when stress is applied to a composite wire rod used for reinforcing structures in the field of civil engineering and bridge construction, etc.

BACKGROUND

A composite wire rod is known as an alternative to PC strand wire. A composite wire rod is formed by compounding continuous fiber, for example carbon fiber, with a thermoset resin, for example an epoxy resin, and stranding the composite wires in, for example, 1×7. A composite wire rod has high tensile strength and a high elasticity constant, like PC strand wire, and is distinguished by its light weight and stainless properties. A composite wire rod is used as a mending cable for an existing bridge, a tendon for reinforcing a pre-stressed concrete girder and a pile, a reinforcing material for a bridge girder made by a post-tension method, etc. in the field of civil engineering and bridge construction. When a composite wire rod is used for the above-described purposes, end fixing for holding both ends of the composite wire rod is necessary to apply stress to the composite wire rod.

As an end fixing structure, a technique relating to anchor ends of electric wires having resin-reinforced carbon fiber as its core is known (for example, Jpn. Pat. KOKAI Publication No. 8-237840). Specifically, a shock-absorbing sleeve having a halved-cylindrical shape, which is made of a metallic material containing zinc as a main component and which has an engaging surface provided on the inner circumferential surface of the sleeve to engage with the outer periphery of resin-reinforced carbon fiber, is used as an anchor end of a stranded electric wire. In an electric wire formed by stranding conductive metal wires around resin-reinforced carbon fiber used as a tension member, the shock-absorbing sleeve is provided between the tension member and the stranded layer of conductive metal wires, and a metallic sleeve is attached around them to compress and fix the metallic sleeve, thereby forming the anchor end. According to this technique, the shock-absorbing sleeve is easily attachable to the resin-reinforced carbon fiber because the sleeve has an engaging surface on the inner circumferential surface to engage with the outer periphery of the resin-reinforced carbon fiber and has a half-divided structure, and when the metallic sleeve is compressed, no compression force is locally applied because of its cylindrical shape; thus, the technique has an effect of preventing damage, such as crushing and cracking, in resin-reinforced carbon fiber.

As an end fixing structure of a composite wire rod, a structure is known in which anti-slipping sheets are superposed on a composite wire rod, and a metallic blade is superposed thereon, and the layered portion is caught between wedges to fix the end of the composite wire rod (for example, Japan Patent No. 5426678). When a wedge clamps the composite wire rod, the anti-slipping sheet and the blade under the wedge are deformed in accordance with the irregular portion of the composite wire rod because of external force generated in the wedge when stressing the composite wire rod; as a result, the shock-absorbing effect caused by the deformation and frictional force caused by the anti-slipping sheet bring about a function of gripping the composite wire rod under a high stress without causing damage to the composite wire rod due to shearing.

Using a resin-made composite shock-absorbing material instead of an anti-slipping sheet has been also proposed (for example, Jpn. Pat. Appln. KOKAI Publication No. 01-272889).

SUMMARY

The above-described end fixing structure of a composite wire rod has the following problems. The above-described technique requires a machine apparatus for performing compression processing to form an anchor end of an electric wire rod made of stranded conductive metal wires. Using a machine apparatus requires a high cost. Furthermore, a halved shock-absorbing sleeve illustrated in the aforementioned technique needs to be metal-made with zinc as a main component to prevent crush damage to a carbon-fiber core caused by local concentration of compression force.

When using multiple anti-slipping sheets superposed on a composite wire rod, it is required to stack a number of anti-slipping sheets in a preparatory stage. If two strips of anti-slipping sheets prepared in advance are attached to a composite wire rod, the direction of the anti-slipping sheets needs to be in parallel with the axial direction of the composite wire rod, and an equal space between the two strips of anti-slipping sheets needs to be maintained; therefore, a great deal of skill and effort are required to accomplish such work.

This method requires a skillful technician and more time for performing many complicated steps.

Furthermore, using a composite shock-absorbing material can shorten a work time up to around ten minutes; however, it takes only one minute of work time for a fixing structure using a PC strand wire, and a further shortening of work time has been sought. Resins as a composite shock-absorbing material have a risk of intolerance for long-term use because continuous application of a large force to resins causes deformation or breakage.

On the other hand, a creep amount of a resin-made composite shock-absorbing material is large, and therefore a resin-made composite shock-absorbing material is not suitable for long-term fixation. Furthermore, the resin of the composite shock-absorbing material cannot tolerate a long-term use because of its creep deformation.

An objective of the present invention is thus to provide an end fixing structure of a composite wire rod that negates a need of a machine apparatus for compression, that allows easy fixation work by an end fixing structure that is capable of maintaining a sufficient gripping power, without using anti-slipping sheets or a composite shock-absorbing material that makes work complicated, and that can tolerate a long-term use.

The end fixing structure of the composite wire rod according to the present invention comprises a composite wire which is formed by compounding continuous fiber with resins and stranding the composite into a shape of stranded wire, a wedge body that is formed into a cylindrical shape with an enlarging diameter from the front end portion as a small diameter side on the tensile side toward the rear end portion as a large diameter side on the fixed side, wherein an engaged portion is formed for engaging with the outer surface of the composite wire rod which is copied onto the inner wall surface, and a sleeve having an inner structure which is conical and hollow, wherein the diameter is gradually enlarged toward the rear end portion as the large diameter side on the fixed side, and the wedge body is composed of a plurality of divided wedge bodies divided in a circumferential direction facing each other on their divided surfaces with a space therebetween, wherein the inner wall surface in the divided wedge body is made of a microscopically irregular surface.

The end fixing structure of the composite wire rod according to the present invention comprises a composite wire which is formed by compounding continuous fiber with resins and stranding the composite into a shape of stranded wire, a wedge body that is formed into a cylindrical shape with an enlarging diameter from the front end portion which receives tensile force toward the rear end portion as a large diameter side on the fixed side, wherein an engaged portion is formed for engaging with the outer surface of the composite wire rod which is copied onto the inner wall surface, and a sleeve having an inner structure which is conical and hollow, wherein the diameter is gradually enlarged toward the rear end portion of the large diameter side on the fixed side, and the wedge is composed of a plurality of divided wedge bodies divided in a circumferential direction facing each other on their divided surfaces with a space therebetween, wherein the inner wall surface in the divided wedge body is made of a microscopically irregular surface.

BRIEF DESCRIPTION OF DRAWINGS

FIG. 3 is a perspective view of the composite wire rod and the wedge body in the end fixing structure.

FIG. 4 is an exploded perspective view of the composite wire rod and the wedge body.

FIG. 5 is a horizontal cross-sectional view of the end fixing structure.

FIG. 6 is an enlarged view of the main components of the end fixing structure.

FIG. 7 is an explanatory drawing showing the relationship among surface roughness, a wedge length, and the fixing efficiency of the end fixing structure.

FIG. 8 is a schematic view of the composite wire rod and the wedge body in the end fixing structure of the composite wire rod according to a second embodiment of the present invention.

FIG. 9 is an exploded perspective view of the composite wire rod and the wedge body in the end fixing structure.

FIG. 10 is a horizontal cross-sectional view of the main components of the end fixing structure.

FIG. 11A is an explanatory drawing of a shift amount test method in the wedge body.

FIG. 12 is an explanatory drawing illustrating the relationship between a load and a wedge position in the shift amount test method.

FIG. 13 is an explanatory drawing illustrating the relationship (a comparison example) between a load and a wedge position in the shift amount test method.

FIG. 14 is an explanatory drawing illustrating the relationship (a comparison example) between a load and a wedge position in the shift amount test method.

DETAILED DESCRIPTION

Hereinafter, embodiments of the present invention will be described with reference to the attached drawings.

Figure 1:
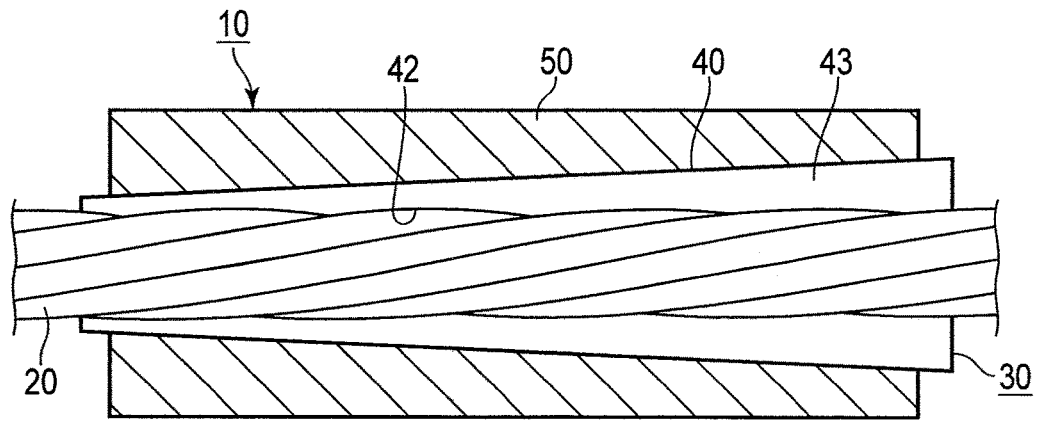
FIG. 1 is a vertical cross-sectional view of an end fixing structure of a composite wire rod according to a first embodiment of the present invention.
Figure 2:
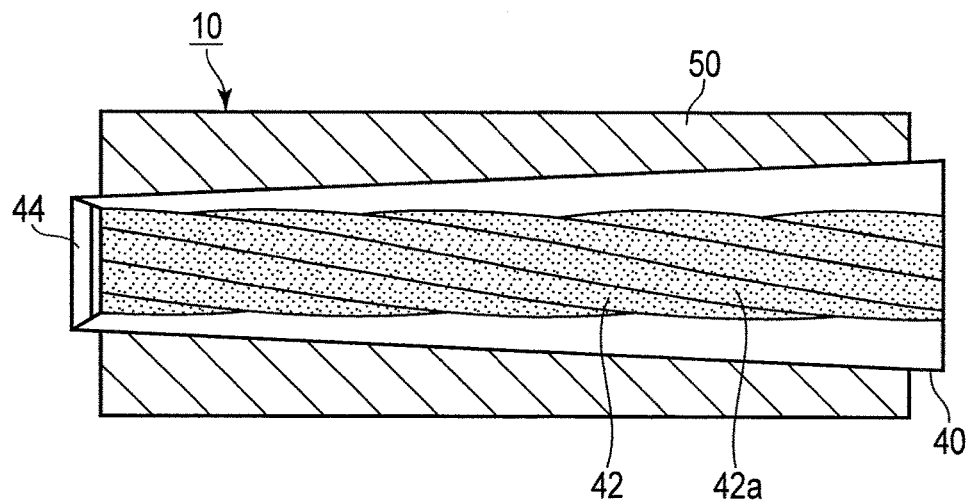
FIG. 2 is a vertical cross-sectional view of a divided wedge body and a sleeve of the end fixing structure.

FIG. 1 is a vertical cross-sectional view of the end fixing structure of the composite wire rod according to the first embodiment of the present invention; FIG. 2 is a vertical cross-sectional view of the divided wedge body and the sleeve in the end fixing structure; FIG. 3 is a perspective view of the divided wedge body and the sleeve in the end fixing structure; FIG. 4 is an exploded perspective view of the divided wedge body and the sleeve in the end fixing structure; FIG. 5 is a horizontal cross-sectional view of the end fixing structure; and FIG. 6 is an enlarged view of the main components of the end fixing structure. In the descriptions, the axial direction is a direction of the extension (a longitudinal direction) of the composite wire rod 20.

The end fixing structure 10 of the composite wire rod comprises a composite wire rod 20 that is a composite of continuous fiber and resins formed into a stranded wire; a metal-made wedge body 30 covering the composite wire rod 20, and a metal-made sleeve 50 provided on the outer peripheral side of the wedge body 30. Tensile force is applied from the left direction in FIG. 1, and the right edge portion is a free edge. The small diameter side on the tensile side of the wedge body 30 is called the front end portion, and the large diameter side on the fixed side is called the rear end portion.

The composite wire rod 20 has a stranded structure composed of a plurality of wires 21. The wire 21 is made of carbon fiber (continuous fiber) and a matrix resin (typically, a thermoset resin, such as an epoxy resin) as main materials.

The composite wire rod 20 having a 1×7 stranded structure with an outside diameter of 15.2 mm is composed of one core wire 21a and six side wires 21b stranded to each other being arranged around the core wire 21a. The core wire 21a and each of the side wires 21b has a diameter of 5.1 mm. An angle made by the core wire 21a and the side wire 21b, in other words a twist angle, is typically 9°, and desirably less than 18°.

The inside diameter of the wedge body 30 is determined by the shape of the composite wire rod 20, which is a target for fixation. Accordingly, it is necessary to secure a sufficient length to achieve a sufficient fixing efficiency under a pressure to the extent that does not crush the composite wire rod 20. Specifically, the length is determined using one pitch as a reference in which the side wire 21b returns to the same position in the circumferential direction. The details of the determining process will be described later.

The wedge body 30 is formed in a hollow, circular truncated cone by combining the divided wedge bodies 40, which are formed as two halves in a circumferential direction.

The divided wedge body 40 has a main body 41 having a half-cylindrical shape, and an irregular portion 42a that is provided in the inner wall surface (engaging portion) 42 of the main body 41 and engages with the outer shape of the composite wire rod 20. The irregular portion 42a has irregularities that are a copy of the outer shape of the wires 21 constituting the composite wire rod 20, and that has a so-called rope pattern. In addition to the irregularities that are a copy of the outer shape, microscopic irregularities 42b are also formed on the inner wall surface as shown in FIG. 6. In FIG. 6, the projection of the irregular portion 42a of the inner wall surface 42 is illustrated between the side wires; however, a chamfering may be provided to facilitate an operation of engaging the composite wire rod 20.

In the inner wall surface 42, high frictional force can be achieved between the composite wire rod 20 and the wedge body 30 by the rope-patterned irregular portion 42a. The microscopic irregularities 42b increase an area of contact with each wire 21 of the composite wire rod 20, and have an effect of further increasing frictional force applied to the composite wire rod 20, which is easily deformable, in the cross-sectional direction. The microscopic irregularities 42b realize a high gripping force and stable fixation over a long time.

To determine appropriate surface roughness and an appropriate wedge length, a tensility test was performed. FIG. 7 shows the relationship among the surface roughness, a wedge length, a fixing load, fixing efficiency, a breakage state, and evaluation when a tensility test was performed for a fixing structure of the composite wire rod 20 with a wedge body with a different surface roughness and wedge length. Fixing efficiency is a ratio of a fixing load to a standard breaking load of a composite wire rod. The fixing efficiency of 75% or higher was evaluated as "good".

There are various methods for adjusting the surface roughness of the divided wedge body 40 which is a casting; in this test, the surface roughness was adjusted by adding irregularities as a post-processing after forming the divided wedge body 40. The surface roughness was measured by a sensing pin-type surface roughness tester.

The preferable surface roughness Rz (10-point average roughness) of the inner surface on which the micro irregularities 42b are formed falls between 60 and 500 μm, and since the micro irregularities 42b having an appropriate size were formed, the frictional force was increased as described above, and a high fixing load was achieved.

When the surface roughness was too small (Rz=30 μm or smaller), the size of the microscopic irregularities 42b were small, and frictional force became low and the composite wire rod 20 fell out. When the surface roughness was too large (Rz=800 μm or larger), the microscopic irregularities 42b were too large and damaged the surface of the composite wire rod 20, and the fixing load could not be increased. On the other hand, the projections of the rope pattern, which is a copy of the grooves between the strands, were scraped off; as a result, the contact area was significantly decreased, and the composite wire rod 20 fell out.

As for the wedge length, a variety of lengths, i.e., 130 mm, 150 mm, 210 mm, 280 mm, were tested under the same surface roughness, Rz=200. One pitch of the composite wire rod 20 is 209 mm. The wedge lengths of 150 mm, 210 mm, and 280 mm passed the test. If the wedge length is 130 mm or below, the composite wire rod 20 was damaged by a lateral pressure of the clamping by the wedge body 30, and the composite wire rod 20 was broken at a low fixing load. In a case of 200 mm which corresponds to one pitch or longer than 200 mm, a higher fixing load was achieved since a frictional area became larger. There is limited practical usefulness if the length exceeds 280 mm, which corresponds to 134% of one pitch. The result of the test shows that 72% to 134% of one pitch is an appropriate length.

A divided surface 43 is formed on the edge face of the main body 41 in the circumferential direction. An enlarged diameter portion 44 in which its diameter gradually enlarges toward the mouth is provided on the front end portion side.

Because of its half-divided structure as described above, the wedge body 30 can be attached to any desired position in the composite wire rod 20, and after the attachment, the wedge body 30 covers the entire circumference of the composite wire rod 20 and the outer shape has approximately a circular truncated cone shape.

The divided wedge body 40 is formed as described below. In other words, 3D CAD data is created using a composite wire rod having the same structure as the above-described composite wire rod 20 having a 1×7 stranded structure with 15.2 mm of the outside diameter as a prototype, or data is obtained by scanning the outer shape of the composite wire rod 20 using a 3D scanner, etc. A mother die is created using the data. A sand mold is created from the mother die, and a divided wedge body 40 is manufactured by casting. Spheroidal graphite cast iron, which excels at moldability, strength, toughness, and fatigue strength, is used as the material. The contraction rate of spheroidal graphite cast iron is 1%, which is smaller than that of 3% for steel; thus, the dimensional accuracy is high. Gray cast iron containing flake graphite has low fatigue strength since fatigue cracks develop between layers; in contrast, spheroidal graphite in the spheroidal graphite cast iron stops fatigue cracks, and the fatigue strength is therefore high. Furthermore, the surface of the inner wall surface of the wedge body is made microscopically irregular within the range of 60 to 500 μm in Rz.

The surface roughness Rz of the inner wall surface 42 of the divided wedge body 40 is measured by a sensing pin-type surface roughness tester.

The inner surface of the divided wedge body 40 has a rope pattern in a stranded-wire shape which will be specifically described next. The rope pattern in a stranded-wire shape obtained by copying an outer shape of the wire 21 has a diameter of 5.1 mm and is an arc angled by 18° or less with respect to the core wire 21a. The microscopic irregularities 42b are also provided in the inner wall surface.

Since the irregular portion 42a on the inner surface of the divided wedge body 40 is in a shape copying the shape of the composite wire rod 20, the rope pattern matches the composite wire rod 20 when the divided wedge body 40 is attached to the composite wire rod 20; thus, the rope pattern having a stranded structure of the composite wire rod 20 is filled with the divided wedge body 40.

The pair of divided wedge bodies 40, which are adjacent with the divided surfaces 43 facing each other therebetween, forms a space S having a predetermined dimension between the surfaces. The predetermined dimension is 3 to 6 mm, for example.

The wedge body 30 has a structure in which the outside diameter is enlarged from the front end portion toward the rear end portion, and the composite wire rod 20 is engaged in the hollow portion therein.

Such an end fixing structure 10 of the composite rod wire is constructed as will be described below. First, the sleeve 50 is fitted around the outer periphery of the composite wire rod 20. Next, the wedge body 30 is formed by fitting a pair of the divided wedge bodies 40 to the composite wire rod 20, with its front end portion being directed toward the sleeve 50. The sleeve 50 is moved toward the wedge body 30 for engagement.

The end fixing structure 10 of the composite wire rod, which is configured as described above, operates in a manner as will be described in the following when the composite wire rod 20 is pulled. Since the composite wire rod 20 and the wedge body 30 are integrated, the wedge body 30 is pulled into the sleeve 50 concurrently when the composite wire rod 20 is pulled. When the wedge body 30 is pulled into the sleeve 50, the wedge body 30 clamps the composite wire rod 20 by its tapering shape. This clamping increases the frictional force of each of the wedge body 30 and the composite wire rod 20, and the integration thereof becomes firmer.

Furthermore, the inner surface of the divided wedge body 40 obtained by the above-described method using the composite wire rod 20 as a prototype has irregularities that are a copy of the outer shape of the wires 21 constituting the composite wire rod 20. These irregularities allow the wedge body 30 to be firmly engaged with the composite wire rod 20, and to have a high gripping power over a long time, since no resin-made shock-absorbing member or the like, is used.

The sleeve 50 is made of metal and has a hollow, cone-shaped inner structure in which its inner diameter is enlarged from the front end portion toward the rear end portion, and the sleeve 50 is formed in a cylindrical shape having a constant outside diameter. The enlarging diameter angle of the outside diameter of the wedge body 30 is made slightly larger with respect to the enlarging diameter angle C of the inside diameter of the sleeve 50. Thus, it is possible to reduce the lateral pressure on the mouth side (the front end portion to which tensile force is applied), thereby achieving effects in decreasing concentration of stress in the mouth area and in obtaining high gripping force. In addition to such a shape, the effects are further improved by R processing on the mouth in the enlarged diameter portion 44, or enlarging the diameter toward the front end side in the mouth area.

Furthermore, since the wedge body 30 is a simple molded structure with a half-divided cylindrical shape, the wedge body 30 can be easily attached to the composite wire rod 20 in a short time without any preparation before the attachment. During an attaching operation, since the inner side of the wedge body 30 has a shape that engages with the composite wire rod 20, the wedge body 30 naturally engages with the composite wire rod 20 by pushing the wedge body 30 against the composite wire rod 20. Thus, no special skill is required, and any ordinary worker can easily achieve a predetermined level of quality.

According to the end fixing structure 10 of the composite wire rod of the present embodiment, fixing force is generated by a clamping force by the wedge body 30 and the sleeve 50, not by a compressing force by a compression apparatus. The composite wire rod 20 is firmly clamped by the wedge body 30, and a high fixing force can be exercised.

Furthermore, since the wedge body 30 is formed in a shape that engages with the outer shape of the composite wire rod 20, thereby requiring only an operation of fitting them together, a desired level of quality can be achieved regardless of the skill of a worker, and a fixation operation can be easily accomplished.

FIG. 8 is a schematic view of the composite wire rod and the wedge body in the end fixing structure 10A of the composite wire rod according to the second embodiment of the present invention. FIG. 9 is an exploded perspective view of the composite wire rod and the wedge body in the end fixing structure. FIG. 10 is a horizontal cross-sectional view of the main components of the end fixing structure. In FIGS. 8 to 10, like reference numerals denote like parts in FIGS. 1 to 6, and a detailed description of such parts will be omitted.

The end fixing structure 10A of the composite wire rod comprises a composite wire rod 20 that is a composite of continuous fibers and resins formed into a stranded wire, a metal-made wedge body 30A covering the composite wire rod 20, and a metal-made sleeve 50 (see FIG. 1) provided on the outer peripheral side of the wedge body 30A.

The wedge body 30A is formed in a hollow, circular truncated cone by combining a pair of the divided wedge bodies 140 and 150, which are formed as two halves in a circumferential direction.

As shown in FIGS. 8 to 10, one of the divided wedge body 140 has a main body 41 in a half-cylindrical shape. An irregular portion 42a that engages with the outer shape of the composite wire rod 20 is provided in the inner wall surface (engaging portion) 42 of the main body 41. A divided surface 43 is formed on the edge face of the main body 41 in the circumferential direction. On the divided surface 43, a projection portion 143 projecting toward a later-described groove portion 153 of the other divided wedge body 150, and a groove portion 144 arranged facing a later-described groove portion 154 are provided.

The other divided wedge body 150 has a main body 41 having a half-cylindrical shape. An irregular portion 42a that engages with the outer shape of the composite wire rod 20 is provided in the inner wall surface (engaging portion) 42 of the main body 41. A divided surface 43 is formed on the edge face of the main body 41 in the circumferential direction. On the divided surface 43, a groove portion 153 arranged facing the aforementioned projection portion 143, and a projection portion 154 projecting toward the aforementioned groove portion 144 are provided, with both of the groove portion 153 and the projection portion 154 facing the divided wedge body 140. The locking of the projection portion 143 with the groove portion 153 and the locking of the projection portion 154 with the groove portion 144 along the axial direction constitute a locking section that restricts the movement of the composite wire rod 20 in the axial direction in the pair of the divided wedge bodies 140 and 150.

During time until breakage occurs due to tension applied to the composite wire rod 20, it is necessary to avoid interfering with the space S between the divided wedge bodies 140 and 150 so that they can exhibit a wedging effect. For this reason, during a no-load state for setting the divided wedge bodies 140 and 150, the space S is much larger because the divided wedge bodies 140 and 150 have not been fully fitted into the sleeve 50. The following conditions are necessary to securely achieve the locking even when the divided wedge bodies 140 and 150 are in a no-load state.

The projection height H of the projection portion 143 is determined by the following conditions. As shown in FIG. 10, the projection portion 143 is formed in such a manner that the projection height H thereof is larger than a difference between a nominal diameter dq of the composite wire rod 20 (the diameter of the circumscribed circle when no load is applied), and twice of a maximum depth K, which is a distance between the divided surface 43 and a maximum depth position of the irregular portion 42a (the position where a depth becomes maximum when the inner wall surface 42 of the irregular portion 42a is rotatively moved along the axial direction). Accordingly, if a pair of the divided wedge bodies 140 and 150 is attached to the composite wire rod 20, a space S is formed therebetween (because the nominal diameter dq is larger than twice of the maximum depth K). Furthermore, the depth L of the groove portion 153 is set to be always deeper than the height H of the projection portion 143 so that the bottom of the groove portion 153 does not interfere with the end of the projection portion 143. Therefore, the depth>the height H>(the nominal diameter dq−the maximum depth 2K), and the projection portion 143 is always inserted into the groove portion 153 while the divided wedge bodies 140 and 150 cover the composite wire rod 20, thereby obtaining a tentative locking state.

A groove 160 is provided in each of the divided wedge bodies 140 and 150 to set an O-ring (not illustrated). If an O-ring is set in the groove 160, it is possible to effectively carry out work of inserting the composite wire rod 20 into the inside of the divided wedge bodies 140 and 150 and positioning the composite wire rod 20 in accordance with the irregular portion 42a of the inner wall surface 42.

According to the end fixing structure 10A of the composite wire rod which is configured as described above, similar to the end fixing structure 10 of the previously-described composite wire rod, the composite wire rod 20 and the wedge body 30 are firmly integrated. On the other hand, a shift may occur depending on a slight difference in balance between the pair of the divided wedge bodies 140 and 150 in the axial direction of the composite wire rod 20. However, since the projection portion 143 and the groove portion 153, and the projection portion 154 and the groove portion 144 lock in the axial direction at a position where the rope pattern matches between the composite wire rod 20 and the irregular portion 42a, it is possible to minimize a shift amount in the axial direction of the composite wire rod 20.

Since the wedge body 30A is made by casting, projection portions and groove portions can be freely formed, and manufacturing of them is easy.

FIGS. 11A, 11B, 12 to 15 are explanatory drawings of a shift amount test method for measuring a displacement quantity depending on the presence/absence of the engaging portions. In the shift amount test method, a composite wire rod is placed in the tensility tester and a wedge body and a sleeve are placed at their predetermined positions, and a load is gradually applied to measure a remaining length from the sleeve to the rear end of the wedge in each load step. Since the wedge body consists of a set of divided wedge bodies, a remaining length from the sleeve to the rear end of the wedge is measured for each divided wedge body. It is assumed that a high fixing performance can be achieved if the plurality of divided wedge bodies are equally pulled in, and if a shift occurs, the fixation performance will be degraded. A shift amount is defined as a difference between the remaining lengths t1 and t2 from the sleeve 50 to the rear end of the wedge in FIG. 11A.

Figure 11B:
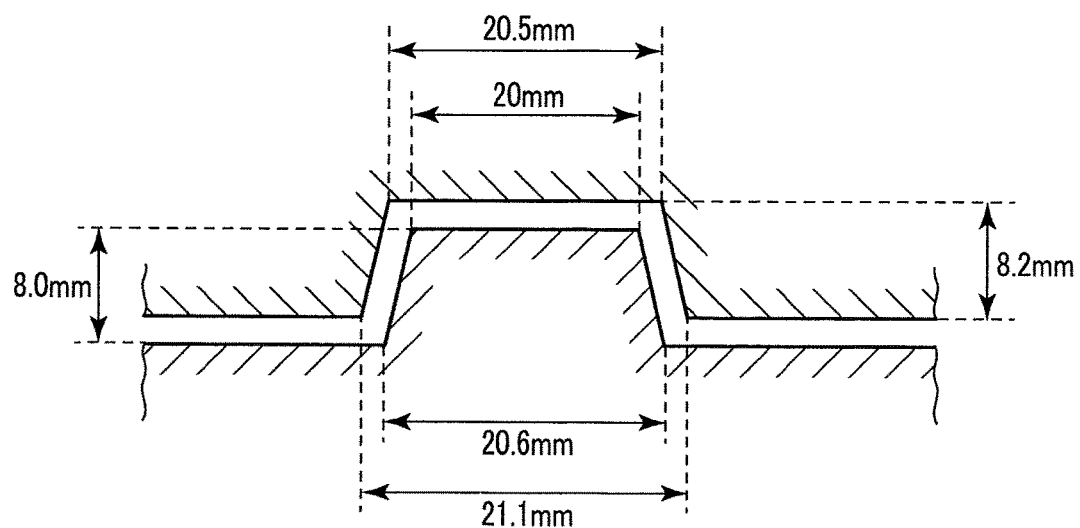
FIG. 11B is an explanatory drawing of a locking section used for the shift amount test method.

In this test method, the composite wire rod 20 of the wires 1×7/the diameter of 15.2 mm and the standard breaking load 270 kN is provided, and the wedge body 30A having the length of 200 mm in the axial direction, and the wedge body 30 having the length of 200 mm in the axial direction were tested. As shown in FIG. 11B, in the locking sections used for this test method, the dimension of the projection portion is defined as the base 20.6 mm, the upper side 20 mm, and the height 8 mm, and the dimension of the groove portion is defined as the base 21.1 mm, the upper side 20.5 mm, and the depth 8.2 mm.

In the end fixing structure 10A of the composite wire rod according to the second embodiment, as shown in FIG. 12 and FIG. 13, a shift did not occur because the divided wedge bodies 140 and 150 as a pair were equally pulled in, and they were broken at 290 kN (1.07 Pu); therefore, a high fixing load was obtained.

Figure 15:
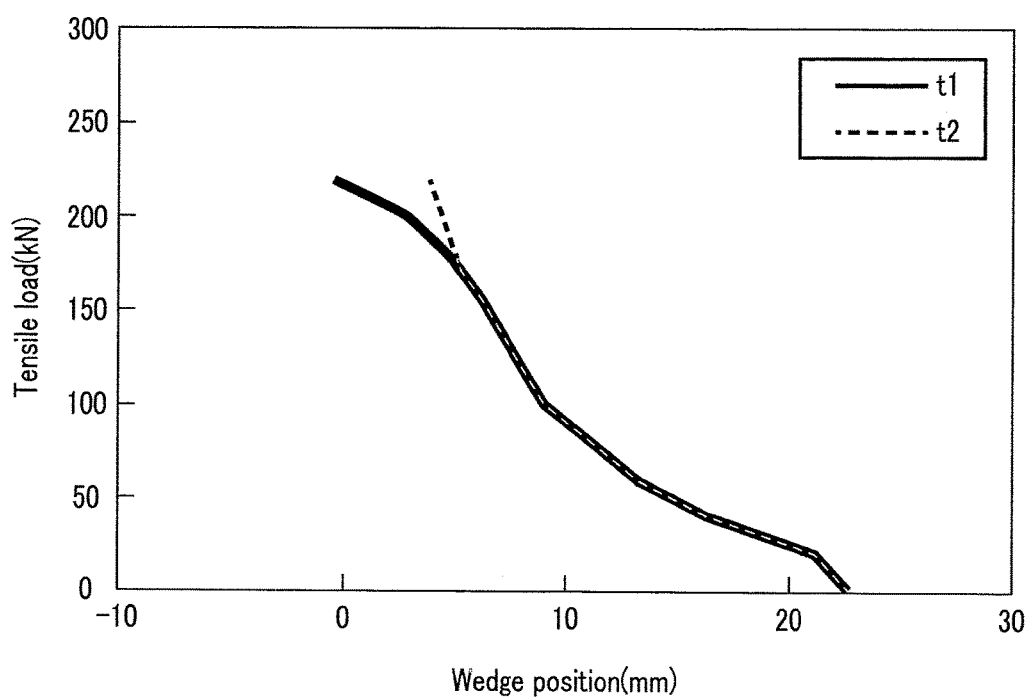
FIG. 15 is an explanatory drawing illustrating the relationship between a load and a wedge position in the shift amount test method.

In contrast, in the comparison example in which no locking sections are provided, as shown in FIGS. 14 and 15, the divided wedge bodies 140 and 150 were equally pulled in up to the level of 180 kN, but after 180 kN, the divided wedge body 140 was pulled in, whereas the divided wedge body 150 was not; therefore, the shift between the divided wedge bodies 140 and 150 occurred, and the shift amount reached 4.29 mm at maximum, and they were broken at a low fixing load of 224 kN (0.83 Pu).

Figure 16:
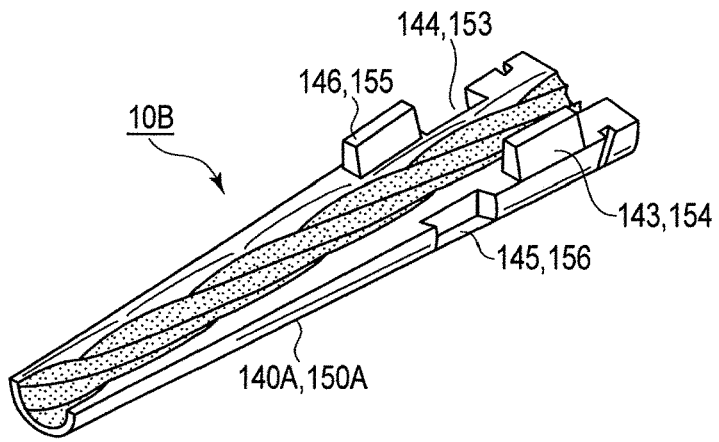
FIG. 16 is an exploded schematic view of the composite wire rod and the wedge body in the end fixing structure of the composite wire rod according to a third embodiment of the present invention.

FIG. 16 is an exploded schematic view of the composite wire rod and the wedge body 30B in the end fixing structure 10B of the composite wire rod according to a third embodiment of the present invention. In FIG. 16, like reference numerals denote like parts in FIGS. 8 to 10, and a detailed description of such parts will be omitted. The wedge body 30B is formed in a hollow, circular truncated cone by combining a pair of the divided wedge bodies 140A and 150A, which are formed as two halves in a circumferential direction.

In the one divided wedge body 140A, another pair of a groove portion 145 and a projection portion 146 is provided in a different position on the axial direction of the composite wire rod 20, in addition to those in the previously-described divided wedge body 140. In the other divided wedge body 150A, another pair of a projection portion 155 and a groove portion 156 is provided in addition to those in the previously-described divided wedge body 150, and the groove portion 145 and the projection portion 155 constitute an engaging portion and the groove portion 156 and the projection portion 146 constitute an engaging portion.

Such a configuration allows achieving the same effects as those achieved by the above-described end fixing structure 10A of the composite wire rod, and it is also possible to achieve stable fixation performance by providing more than one pair of a small projection portion and a groove portion even when a large projection portion cannot be formed because of a small divided wedge body.

Figure 17:
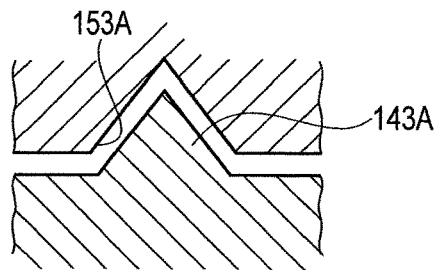
FIG. 17 is an explanatory drawing of the main components of the wedge body according to a modification of the present invention.
Figure 18:
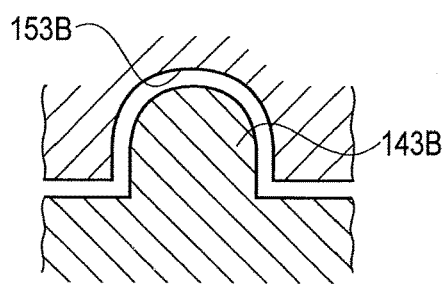
FIG. 18 is an explanatory drawing of the main components of the wedge body according to a modification of the present invention.

In the above-described wedge bodies 30A and 30B, the projection portion 143 is formed in a rectangular parallelepiped; however, the shape is not limited thereto. It may be a conical shape like the projection portion 143A and the groove portion 153A as shown in FIG. 17, or may be a semi-spherical shape like the projection portion 143B and the groove portion 153B as shown in FIG. 18.

The embodiments described above are not restrictive. For example, a wedge body may be divided into three or four. Other than the above, various modifications may be carried out without departing from the spirit of the present invention.

INDUSTRIAL APPLICABILITY

The structure of maintaining sufficient frictional force achieves an end fixing structure of a composite wire rod that allows easy fixation work, without using a compression apparatus or a shock-absorbing member.

The invention claimed is:

1. An end fixing structure of a composite wire rod that is a composite of continuous fiber and resins formed into a stranded wire, the end fixing structure comprising:
a wedge body that has a cylindrical shape with an enlarging diameter from a front end portion which receives tensile force toward a rear end portion as a large diameter side on a fixed side, wherein an engaged portion is provided on an inner wall surface of the wedge body for engaging with an outer surface of the composite wire rod, the engaged portion having a shape which is a copy of an outer shape of the composite wire rod; and
a sleeve provided on an outer peripheral side of the wedge body and having a conical and hollow inner structure in which a diameter is enlarged toward a rear end portion at the fixed side;
wherein the inner wall surface of the wedge body is made of a microscopically irregular surface,
wherein the wedge body comprises a plurality of divided wedge bodies which are divided with respect to each other along a circumferential direction of the wedge body, wherein divided surfaces of the divided wedge bodies face each other with a space therebetween,
wherein the plurality of divided wedge bodies are provided with a locking section that restricts mutual relative movement of the divided wedge bodies in an axial direction of the composite wire rod, and
wherein the locking section comprises a projection portion provided in one of the divided wedge bodies facing another one of the divided wedge bodies, and a groove portion provided in said another one of the divided wedge bodies.

2. The end fixing structure of the composite wire rod according to claim 1, wherein a surface roughness of the inner wall surface of the wedge body is in a range of $Rz=60$ to 500 μm.

3. The end fixing structure of the composite wire rod according to claim 1, wherein a length of the wedge body is 72% to 134% of one pitch of a side wire of the composite wire rod.

4. The end fixing structure of the composite wire rod according to claim 1, wherein a material of the wedge body is spheroidal graphite cast iron having a contraction rate of about 1%.

5. The end fixing structure of the composite wire rod according to claim 1, wherein a diameter enlarging angle of an inside diameter of the sleeve is equal to or smaller than a diameter enlarging angle of an outside diameter of the wedge body, and an inside diameter of a front end portion side of the engaging portion is smoothly enlarged.

6. An end fixing structure of a composite wire rod that is a composite of continuous fiber and resins formed into a stranded wire, the end fixing structure comprising:
a wedge body that has a cylindrical shape with an enlarging diameter from a front end portion which receives tensile force toward a rear end portion as a large diameter side on a fixed side, wherein an engaged portion is provided on an inner wall surface of the wedge body for engaging with an outer surface of the composite wire rod, the engaged portion having a shape which is a copy of an outer shape of the composite wire rod; and
a sleeve provided on an outer peripheral side of the wedge body and having a conical and hollow inner structure in which a diameter is enlarged toward a rear end portion at the fixed side;
wherein the inner wall surface of the wedge body is made of a microscopically irregular surface,
wherein the wedge body consists of a pair of divided wedge bodies which are divided with respect to each other along a circumferential direction of the wedge body, wherein divided surfaces of the divided wedge bodies face each other with a space therebetween,
wherein the pair of the divided wedge bodies are provided with a locking section that restricts mutual relative movement of the divided wedge bodies in an axial direction of the composite wire rod, and
wherein the locking section comprises a projection portion provided in one divided wedge body facing the other divided wedge body, and a groove portion provided in the other divided wedge body.

7. The end fixing structure of the composite wire rod according to claim 6, wherein the projection portion is formed in such a manner that a height thereof is larger than a difference between a nominal diameter of the composite wire rod and twice a distance between the one of the divided surfaces and a maximum depth position of the inner wall surface.

* * * * *